W. H. COLES.
IRRIGATION APPARATUS.
APPLICATION FILED APR. 17, 1915.
1,154,380.
Patented Sept. 21, 1915.
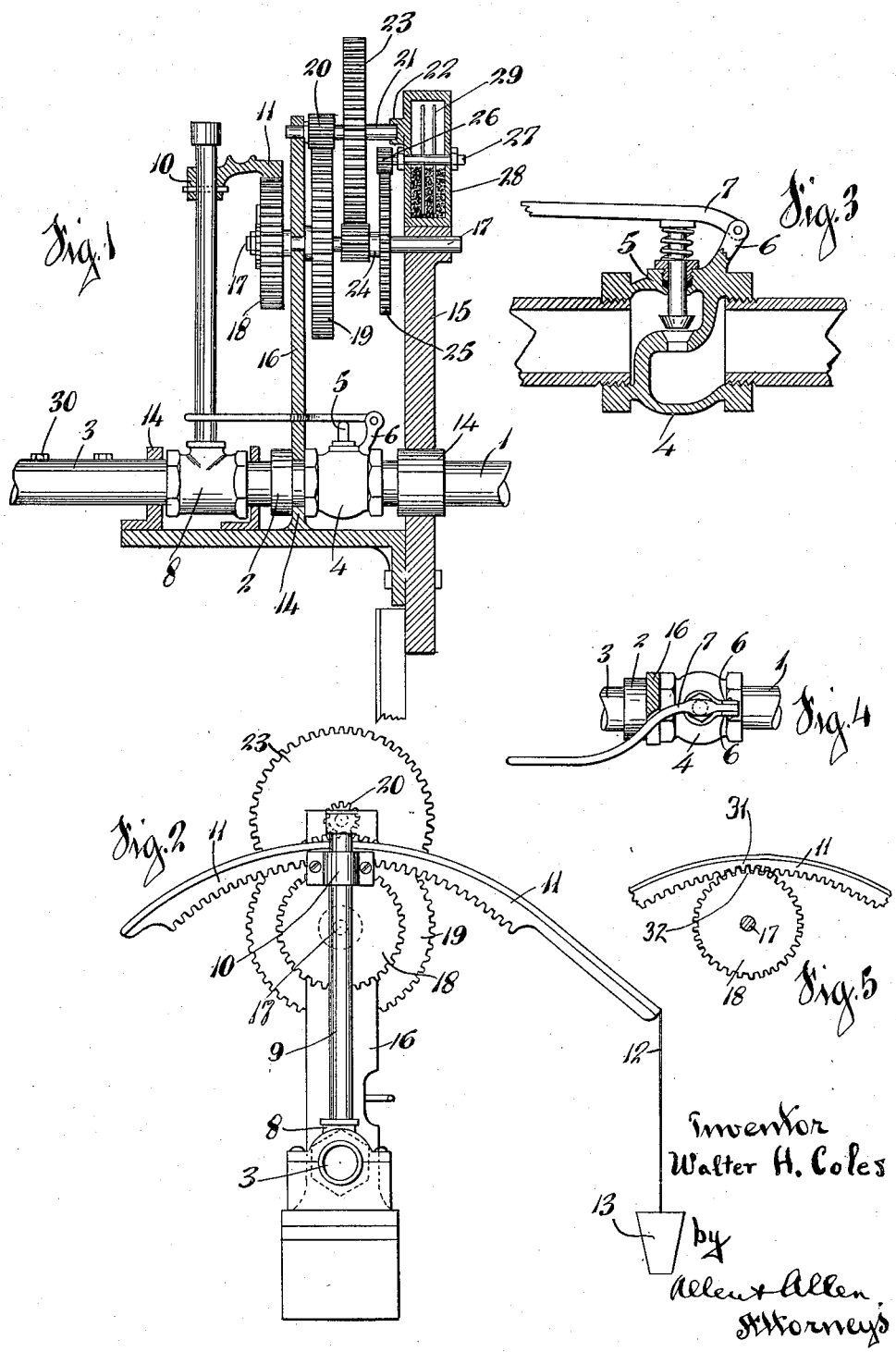

ered as possible.

UNITED STATES PATENT OFFICE.

WALTER H. COLES, OF TROY, OHIO.

IRRIGATION APPARATUS.

1,154,380.         Specification of Letters Patent.      Patented Sept. 21, 1915.

Application filed April 17, 1915. Serial No. 22,039.

*To all whom it may concern:*

Be it known that I, WALTER H. COLES, a citizen of the United States, and a resident of the city of Troy, in the county of Miami and State of Ohio, have invented certain new and useful Improvements in Irrigation Apparatus, of which the following is a full, clear, and exact description, reference being had to the accompanying drawings, forming part of this specification.

My invention relates to irrigation apparatus of the type wherein a pipe, along the length of which are set a series of nozzles, is supported on or over the surface of the ground, supplied with water and slowly rocked or revolved, to distribute the water from the nozzles over an extended area. In apparatus of this nature, it is desired to have a mechanical means of imparting the rocking movement, this movement to be extremely slow so that a complete rocking through, say an arc of one hundred and twenty degrees, will take several hours.

It is the object of my invention to provide means of this character for such an irrigation apparatus, and also to provide means for automatically stopping the flow of water through the pipe when the complete arc has been accomplished. This object I accomplish by that certain construction and arrangement of parts to be hereinafter more specifically pointed out and claimed, whereby a falling weight is utilized for actuating the rocking device, said device being easily reversed to start a new rocking and provided with a shut-off valve to stop the flow of water when the weight has fallen to the end of the stroke.

In the drawings, Figure 1 is a side elevation of the device with the frame pieces in section. Fig. 2 is an end elevation thereof. Fig. 3 is a vertical section of the water valve. Fig. 4 is a top plan view thereof. Fig. 5 is an alternative form of segment and gear in diagram.

As shown in the drawings, there is a fixed or feeder line of pipe 1, having a rotatable coupling 2, with a sprinkling pipe 3, and set into the line 1 ahead of the rotatable coupling, is a valve 4 for shutting off the water in said feed line. It will be understood that it would be readily possible to insert in the feed line beyond the valve 4 and ahead of the rotatable coupling 2, a branch line to another pipe so that the device could be used for a number of lines as well as one, but for purposes of easy illustration of the principle and structure of my device, I have chosen to illustrate but one line, it not being deemed necessary to illustrate the device in its more extended application.

The valve 4 has a spring-pressed stem 5, a depression of which closes the valve, and mounted on small bracket arms 6, 6, a lever 7 which when pressed down on its outer end will depress the stem.

Coupled to a T 8 on the sprinkling pipe is an arm 9 for rotating or rocking said pipe, and mounted on a tight collar 10 at the upper end of this arm, so as to lie in a vertical plane, is an internally toothed segment 11. From one end of this segment depends, on a proper cord or chain 12, a weight 13. For purposes of economy it is not desired to furnish a heavy metal weight of the usual type, but rather to provide a bucket which can be filled with water or stones by the user. To prevent the immediate falling of the weight and thus a quick pulling over of the sprinkling line, I provide a governor gear train to intermesh with the internal teeth of the segment, as follows: The train need be of no particular construction, but it should be stout, able to stand the weather, and as inexpensive as possible. Accordingly I mount on suitable collars 14, 14, on the two pipes, a supporting frame for the gear train comprising two upwardly extending arms 15, 16. These arms supply journals for the main shaft 17 of the governor train. The one end of this shaft is arranged to extend under the toothed segment 11, and loosely mounted at this point so as to mesh with the teeth of said segment is a gear 18. This gear has preferably an internal ratchet connection with the shaft 17 so that when moving in the direction of the weight, it will turn said shaft, and when moving away therefrom, during the raising of the weight, it will be out of engagement with the shaft. This gear is preferably of a size to complete one revolution while the segment is falling through an arc of one hundred and twenty degrees. Mounted on the shaft is a fixed gear 19 of a large number of teeth, said gear being in mesh with a small pinion 20. This pinion 20 is mounted on a second shaft 21 of the train, which finds its journals in the arm 16, and at the other end at 22 on the casing of the governor mechanism to be hereinafter described. On this same shaft is mounted a gear 23 of many teeth and this gear meshes with a pinion which is carried on the main shaft 17 on a sleeve 24 loosely mounted thereon, which said sleeve likewise carries a gear 25 of many teeth. The gear 25 meshes with a pinion 26, which pinion is the end of the train. It can be seen that one rotation of the gear 18 which as stated above meshes with the pipe turning segment, will impart a great many revolutions to the pinion 26, the desired relation being one revolution in ninety minutes of the gear 18 to one revolution in three seconds of the pinion 26.

To apply a brake to the pinion 26, which is the preferred method of controlling the governor train, the pinion is fixedly mounted on its shaft 27, and this shaft is rotatably mounted in a box 28 on the arm 15. The box, which is of circular shape, is half filled with shot, and vanes 29 mounted on the shaft are arranged so as to be forced through the shot every time the pinion 26 is turned. This naturally will retard the motion of the shaft and hence the pinion, and this retardation will suffice to hold the gear train from rapid movement and so retard the movement of the segment 11, that it will complete its arc in say two hours. The amount of retardation depends, of course, on the relation of the gears in the train, the exact nature of the vanes in the shot case, the kind of shot and the like. It is not desired to be limited to this specific means of governing the movement of the toothed segment, however, as the one described is merely the preferred form. The vanes might be made wider, and glycerin, oil, or water used as a retarder, for example.

It will be remembered that the water in the fixed or feeder pipe of the sprinkling system described was stated to be shut off by means of a valve 4, controlled by a lever 7 pivoted over the top of its stem. It is desired to have this lever extended so that its extreme end lies in the path of the segment arm 9. When this arm has been pulled to the end of its downward stroke and the sprinkler pipe has rocked through the full arc of one hundred and twenty degrees, this arm 9 will push down on the lever and shut off the water.

The operation of the device is simple. Beginning with the weight as far down as it can go and the arm 9 stopped by butting against the lever 7 of the shutoff valve, the operator pulls the segment upwardly so that the teeth at its lower end are just in mesh with the gear 18. This can be done because the gear 18 is connected to the governor train by a ratchet, as described. This will also allow the valve 4 to open so that the water will flow through the sprinkler pipe and nothing else need be done by the operator as the weight will slowly fall, controlled by the governor train, thereby slowly rocking the sprinkler pipe until finally coming to a stop and shutting off the water as described.

It is not desired to be limited in the claims which follow to any particular mechanical expedient adopted to accomplish the movements in my apparatus, unless such expedients are specifically referred to, as it is believed that broad novelty lies in the operation by mechanical means energized by merely turning the rotating pipe to starting position which rocks a sprinkler pipe at a very slow rate and automatically shuts off the water at a desired point, as distinguished from operation by water motors and the like.

If desired to obtain the retardation of the speed of oscillation of the sprinkler pipe at such time as it is sending out sprays substantially vertically, through the nozzles 30, there may be an eccentric surface 31 formed in the segment at the central point and at 32 on the gear 18 (Fig. 5).

Having thus described my invention, what I claim as new and desire to secure by Letters Patent, is:—

1. In an irrigation device of the character described, in combination with a sprinkler pipe mounted so as to rotate, a means for rotating said pipe adapted to be energized by turning the pipe to starting position, and means in connection therewith for shutting off the water from the pipe at a given point.

2. In an irrigation device of the character described, in combination with a sprinkler pipe mounted so as to rotate, means operated by a falling weight for rotating said pipe and means in connection therewith for shutting off the water from the pipe at a given point.

3. In an irrigation device of the character described, in combination with a sprinkler pipe mounted so as to rotate, a means for rotating said pipe adapted to be energized by turning the pipe to starting position, means in connection therewith for shutting off the water from the pipe at a given point, and means for retarding the action of the rotating means so that it imparts very slow rotation to the pipe.

4. In an irrigation device of the character described, in combination with a sprinkler pipe mounted so as to rotate, means operated by a falling weight for rotating said pipe, means in connection therewith for shutting off the water from the pipe at a given point, and means for retarding the weight operated means so that it imparts very slow rotation to the pipe.

5. In an irrigation device of the character described, in combination with a sprinkler pipe mounted so as to rotate, a weight operated segment connected to said pipe, and a governing device to retard the motion of the segment to very slow rocking, a ratchet connection between the governing device and the segment, and means operated by said segment for turning off the water from said pipe.

6. In an irrigation device of the character described, in combination with a sprinkler pipe mounted so as to rotate, a weight operated segment connected to said pipe, and a governing device to retard the motion of the segment to very slow rocking, a ratchet connection between the governing device and the segment, a valve for turning off the water from the pipe and a lever for operating the same lying in the path of the segment to stop the segment and close off the water from the pipe.

7. In an irrigation device of the character described, in combination with a sprinkler pipe mounted so as to rotate, means operated by a falling weight for rotating said pipe, means for stopping the rotation at a given point and shutting off the water therefrom at a given point.

8. In an irrigation device of the character described, in combination with a sprinkler pipe mounted so as to rotate, a means for rotating said pipe adapted to be energized by turning the pipe to starting position, and means for stopping rotation at a given point and simultaneously turning off the water.

9. In an irrigation device of the character described, in combination with a sprinkler pipe mounted so as to rotate, a means for rotating said pipe adapted to be energized by turning the pipe to starting position, and means for stopping rotation at a given point, and simultaneously turning off the water, and means for retarding the action of the rotating means so that it imparts very slow rotation to the pipe.

10. In an irrigation device of the character described, in combination with a sprinkler pipe mounted so as to rotate, means operated by a falling weight for rotating said pipe, means for stopping the rotation at a given point, and means for varying the speed of rotation of the pipe at a given point.

11. In an irrigation device of the character described, in combination with a sprinkler pipe mounted so as to rotate, a means for rotating said pipe adapted to be energized by turning the pipe to starting position, and means for varying the speed of rotation thereof at a given point.

12. In an irrigation device, a sprinkler pipe mounted so as to rotate, a segment gear connected thereto, a weight for actuating the segment, a gear in mesh with the segment gear, means for retarding the movement of the gear in one direction, and eccentrics on the segment and gear to vary the motion transmitted by the segment to the rotatable pipe.

WALTER H. COLES.

Witnesses:
WILLIAM SHEPARD,
KATHERINE SMITH.

Copies of this patent may be obtained for five cents each, by addressing the "Commissioner of Patents, Washington, D. C."